(12) United States Patent
Goloubev et al.

(10) Patent No.: US 12,039,276 B2
(45) Date of Patent: Jul. 16, 2024

(54) ANOMALY CLASSIFICATION WITH ATTENDANT WORD ENRICHMENT

(71) Applicant: Cisco Technology, Inc., San Jose, CA (US)

(72) Inventors: Dmitri Goloubev, Waterloo (BE); Nassim Benoussaid, Louvain-la-Neuve (BE); Volodymyr Iashyn, Brussels (BE); Borys Viacheslavovych Berlog, Brussels (BE); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 368 days.

(21) Appl. No.: 16/914,899

(22) Filed: Jun. 29, 2020

(65) Prior Publication Data

US 2021/0342543 A1     Nov. 4, 2021

Related U.S. Application Data

(60) Provisional application No. 63/017,055, filed on Apr. 29, 2020.

(51) Int. Cl.
*G06F 40/30* (2020.01)
*G06F 16/35* (2019.01)
(Continued)

(52) U.S. Cl.
CPC ............ *G06F 40/30* (2020.01); *G06F 16/353* (2019.01); *G06F 40/279* (2020.01); *G06F 16/285* (2019.01); *G06N 20/00* (2019.01)

(58) Field of Classification Search
CPC .............................. G06F 40/30; G06F 40/279
See application file for complete search history.

(56) References Cited

U.S. PATENT DOCUMENTS

| 8,887,286 B2 | 11/2014 | Dupont et al. |
| 9,716,721 B2 | 7/2017 | Hovor et al. |

(Continued)

OTHER PUBLICATIONS

Menzies, Tim et al., "Automated Severity Assessment of Software Defect Reports," https://www.researchgate.net/profile/Tim_Menzies/publication/224343298_Automated_Severity_Assessment_of_Software_Defect_Reports/links/575e964008ae9a9c955f516b.pdf, Nov. 2008, 12 pages.

(Continued)

*Primary Examiner* — Scott T Baderman
*Assistant Examiner* — Seung Woon Jung
(74) *Attorney, Agent, or Firm* — Edell, Shapiro & Finnan, LLC

(57) ABSTRACT

A method includes associating anomalous first text, from a first unstructured data set, with a first classification; processing the first unstructured data set using at least one of ML or AI to identify a second text that is in close context to the first text, and adding the second text to a text list associated with the first classification; enriching the text list by processing the second text to generate a third text, and adding the third text to the text list to produce an enriched text list and such that the third text is also associated with the first classification; matching the text in the enriched text list to text in a second unstructured data set; and classifying the text in the second unstructured data set as having the first classification when the text in the second unstructured data set matches text in the enriched text list.

20 Claims, 9 Drawing Sheets

(51) Int. Cl.
*G06F 40/279* (2020.01)
*G06F 16/28* (2019.01)
*G06N 20/00* (2019.01)

(56) References Cited

U.S. PATENT DOCUMENTS

| | | | |
|---|---|---|---|
| 11,374,952 B1* | 6/2022 | Coskun | G06N 3/0454 |
| 2018/0314835 A1 | 11/2018 | Dodson et al. | |
| 2019/0124099 A1 | 4/2019 | Matselyukh | |
| 2019/0199745 A1* | 6/2019 | Jakobsson | H04L 63/1483 |
| 2019/0327251 A1* | 10/2019 | Muddu | G06N 20/20 |
| 2020/0045077 A1* | 2/2020 | Chiba | H04L 63/1441 |
| 2021/0141897 A1* | 5/2021 | Seifert | H04L 63/1408 |
| 2021/0200612 A1* | 7/2021 | Martyanov | G06F 11/3006 |
| 2021/0304280 A1* | 9/2021 | Saad | G06N 7/01 |

OTHER PUBLICATIONS

Ruff, Lukas et al., "Self-Attentive, Multi-Context One-Class Classification for Unsupervised Anomaly Detection on Text," https://www.aclweb.org/anthology/P19-1398.pdf, Proceedings of the 57th Annual Meeting of the Association for Computational Linguistics, pp. 4061-4071, Jul. 28-Aug. 2, 2019, 11 pages.

Mahapatra, Amogh et al., "Contextual Anomaly Detection in Text Data," Oct. 19, 2012, 21 pages.

Du, Min et al., "DeepLog: Anomaly Detection and Diagnosis from System Logs through Deep Learning," https://acmccs.github.io/papers/p1285-duA.pdf, CCS'17, Oct. 30-Nov. 3, 2017, 14 pages.

* cited by examiner $$\cos\left(\frac{v(drop)}{v(drops) \times v(loss)}\frac{}{v(fault)}\right) = \begin{pmatrix} 0.93 \\ 0.71 \\ 0.25 \end{pmatrix}$$

FIG.5

ANOMALY CLASSIFICATION WITH ATTENDANT WORD ENRICHMENT

CROSS REFERENCE TO RELATED APPLICATION

This application claims the benefit of U.S. Provisional Application No. 63/017,055, filed Apr. 29, 2020, the entirety of which is incorporated herein by reference.

TECHNICAL FIELD

The present disclosure relates to automatically identifying and classifying anomalies found in structured or unstructured data.

BACKGROUND

As computer networks continue to increase in size, the volume of event logs generated by individual networking devices in a network can be quite large. For example, current wireless controllers can scale to approximately 150,000 users. In another example, some broadband platforms now support up to 100,000 users. In such devices, information may be captured about each individual session. When a particular user session fails, isolating tracelog information for the failed session from among the large volume of logs can become very cumbersome due to the number, size, and distribution of the logs. To complicate matters further, many logs today are unstructured, meaning that they do not follow a predefined data model, making searching much more challenging.

BRIEF DESCRIPTION OF THE DRAWINGS

FIG. 5 shows the use of a cosine similarity measure approach in accordance with an example embodiment.

DESCRIPTION OF EXAMPLE EMBODIMENTS

Overview

Figure 1:
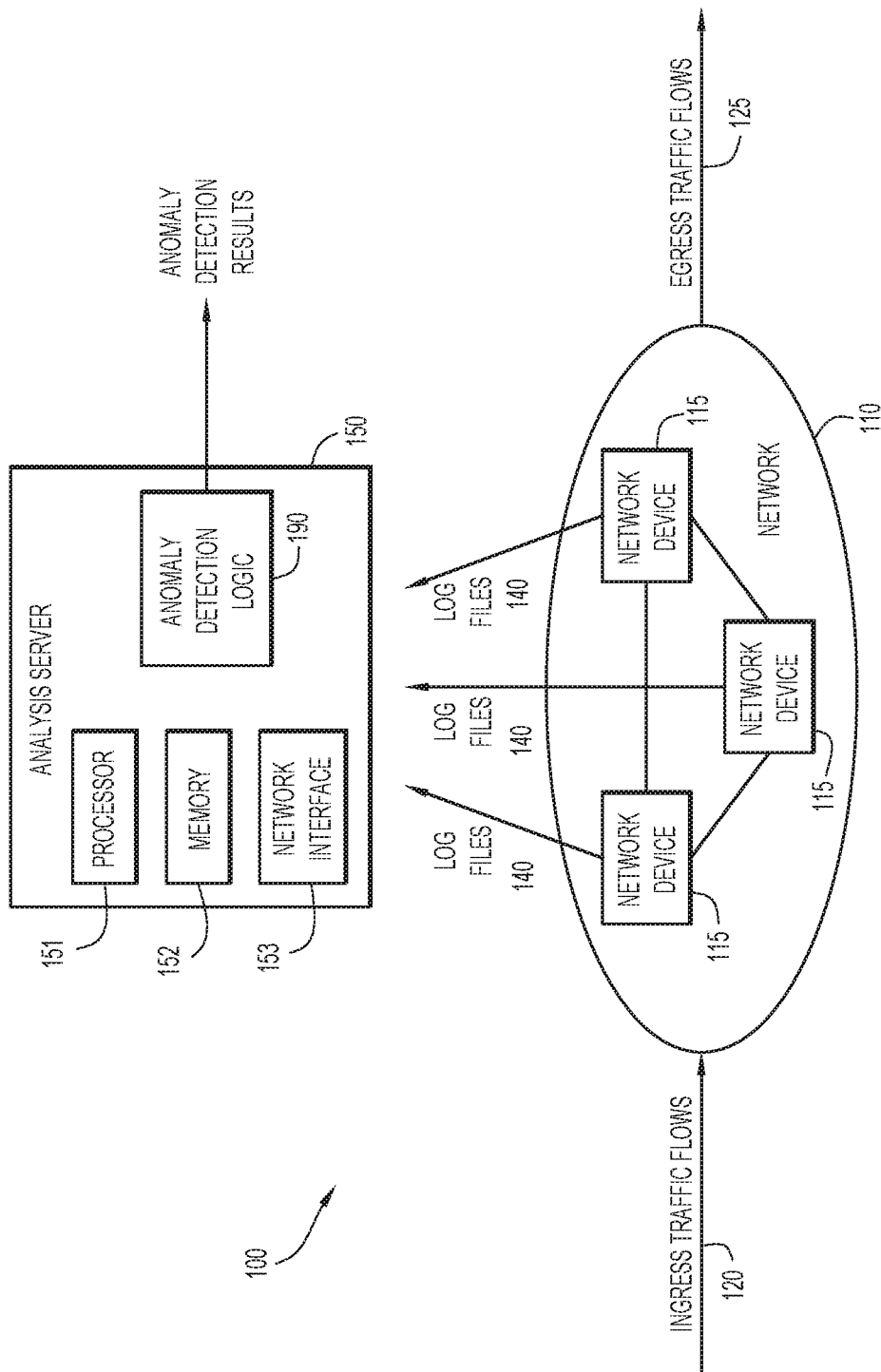
FIG. 1 shows a system including a network and an accompanying analysis server, which executes anomaly detection logic in accordance with an example embodiment.

Presented herein are methods for classifying anomalies found in structured or unstructured data sets. In one embodiment, a method includes associating anomalous first text, from a first data set, with a first classification; processing the first data set using at least one of machine learning or artificial intelligence to identify a second text that is in close context to the first text in the first data set, and adding the second text to a text list associated with the first classification; enriching the text list by processing the second text to generate a third text, and adding the third text to the text list to produce an enriched text list and such that the third text is also associated with the first classification; matching the second text and the third text in the enriched text list to text in a second data set; and classifying the text in the second data set as having the first classification when the text in the second data set matches the second text or the third text in the enriched text list.

A device or apparatus is also described. The device may include a network interface unit configured to enable communications via a network; a memory configured to store logic instructions; and a processor, when executing the logic instructions, configured to: associate anomalous first text, from a first data set, with a first classification; process the first data set using at least one of machine learning or artificial intelligence to identify a second text that is in close context to the first text in the first data set, and add the second text to a text list associated with the first classification; enrich the text list by processing the second text to generate a third text, and add the third text to the text list to produce an enriched text list and such that the third text is also associated with the first classification; match the second text and the third text in the enriched text list to text in a second data set; and classify the text in the second data set as having the first classification when the text in the second data set matches the second text or the third text in the enriched text list.

EXAMPLE EMBODIMENTS

Text anomaly detection systems used to be supervised and operated on structured data, which makes anomalies more easily interpretable and more easily classified in terms of severity. With the growth of artificial intelligence (AI) and deep learning, unsupervised systems that detect anomalies in unstructured text have begun to enter the anomaly detection landscape.

However, an issue with unsupervised learning is that it functions effectively like a black box, wherein the process might detect many words/parts of text that are unlikely to be observed (e.g., by a subject matter expert), such that there is limited knowledge regarding whether the given text is something worth flagging at all or something potentially very critical.

In an effort to address this shortcoming, embodiments described herein improve upon unsupervised (and supervised) techniques by seeding an anomaly detection system with a known list of words or phrases that are associated with anomalies, and then subsequently enriching the list of words or phrases to expand the list. The resulting expanded list is then used as a word matching list against structured or unstructured text (e.g., log files) to identify anomalies and, in addition, to classify those anomalies (e.g., with respect to a severity level).

Reference is now made to FIG. 1, which shows a system 100 including a network 110 and an accompanying analysis server 150, which executes anomaly detection logic 190 in accordance with an example embodiment. Network 110 might be an enterprise network, local area network, wide area network, or public or private network comprising any number of interconnected network devices 115, which might be, e.g., switches, routers or controllers, among other possible network components. Network 110 receives ingress traffic flows 120 (e.g., packets), and routes, switches, or otherwise directs the ingress traffic flows 120 to pass through network 110 and exit via as egress traffic flows 125 (e.g., packets). The network devices 115 might switch or route the flows and/or may act on (i.e., control) the flows in a more substantive way.

Network devices 115, as they process or operate on packets traversing network 110, generate log files 140. In some cases, the log files 140 are structured, and in some cases they are unstructured. Even if structured, log files 140 generated by network devices 115 manufactured by different vendors might have different structures and thus not follow a generic or well-known or standard format. In accordance with the embodiments described herein, the log files 140 are communicated to analysis server 150, which hosts anomaly detection logic 190, which is described more fully below. Analysis server 150 also includes, at a high level, a processor 151, memory 152, and a network interface 153 via which analysis server 150 can receive the log files 140. More details regarding the hardware associated with analysis server is described later in connection with FIG. 9.

In accordance with an embodiment, analysis server, and more specifically, anomaly detection logic 190, classifies anomalies in the log files 140 by, e.g., severity or importance thus enabling the system to filter down to anomalies that are the most important and severe ones.

The embodiments take an approach that tries, in some ways, to automate the approach taken by experts to evaluate the severity of anomalies in text data of log files 140. The way an expert might assess the severity is by looking in the close context of the anomaly for words that might attract their attention, such as "drops," "errors," and "CRC" (cyclical redundancy check), which are example terms that are often found in log files 140 and that might be a cause of concern for a network administrator (i.e., an expert in a particular domain such a switching, routing, etc.).

Thus, in an embodiment, a dataset for a specific domain (e.g., a given switching device's log output) is created, and anomalies and their close context (e.g., surrounding 1, 2, 3, 5, 10, etc., words/lines) are mapped to a severity class tagged by an expert (severity_degree1, severity_degree2, . . . ). While the type of classification described herein is focused on severity level, those skilled in the art will appreciate that other types or forms of classification may also be supported by the instant embodiments.

Embodiments comprise building an explainable model to learn the correlation between the words surrounding the anomalies and the severity. The models can be either statistical (ngrams or simple frequency based) or more complex machine learning (ML) models such as deep neural networks with an attention mechanism. In the latter case, an embodiment of anomaly detection logic 190 might select the words with the highest attention score that help predict a certain severity degree.

Figure 2:
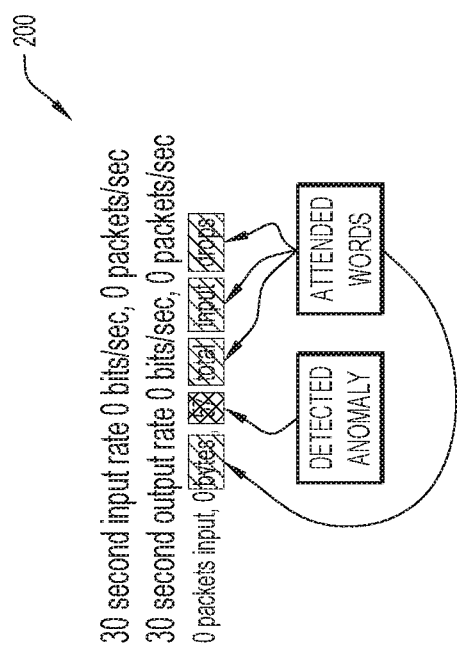
FIG. 2 is an example of an annotated unstructured data set in accordance with an example embodiment.

FIG. 2 is an example of an annotated unstructured data set 200 in accordance with an example embodiment. FIG. 2 shows a perceived severity (e.g., high/low) of selected text (possibly annotated or tagged by an expert). Having observed multiple examples of similar textual output, the model learns to correlate "attended words", i.e., those surrounding a given anomaly (e.g., the "high" number "57") with particular severity. In other words, as shown in FIG. 2, the number "57" is a tagged anomaly since the number of bytes being dropped should not be at such a level. With that anomaly so tagged, the words surrounding the detected anomaly (i.e., "bytes", "total", "input" and "drops") can be considered "attended words." The output of the model, then, is a list of selected words (i.e., attended words) that, when they are found around an anomaly in a given text (i.e., log file 140), are strong indicators of a specific severity degree.

Figure 3:
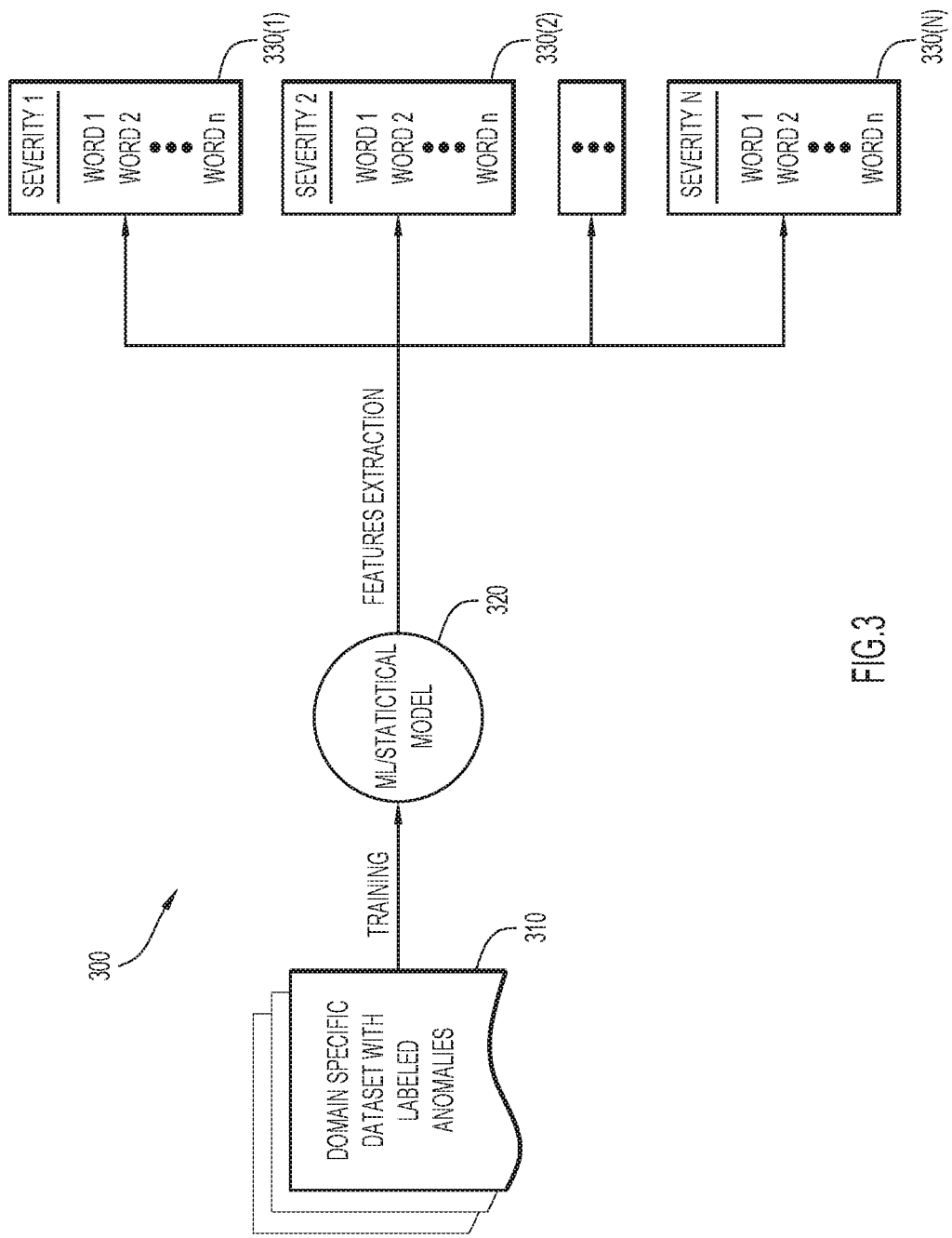
FIG. 3 shows a workflow for creating word or text lists that are associated with respective classifications (e.g., severities) in accordance with an example embodiment.

FIG. 3 shows a workflow 300 for creating word lists that are associated with respective severities in accordance with an example embodiment. At 310, a domain specific dataset with labeled anomalies is provided as training data. Such a data set could be like the annotated unstructured data set 200 shown in FIG. 2. The dataset is passed to a machine learning (ML) or statistical model at 320 which performs features extraction, i.e., the model builds lists of words (attended words) 330(1), 330(2), 330(N) that are associated with respective severities or severity levels (i.e., classifications). Lists of words 330(1), 330(2), 330(N) may be created using selected static/dynamically chosen parameters such as thresholds on attention weights, statistical significance (p-values) or other thresholds depending on the type of model chosen at 320.

Lists of words 330(1), 330(2), 330(N) may be considered useful on their own to assign specific severity to some of the anomalies, but they are somewhat limited in a sense that it is unreasonable to expect an expert to review a whole range of possible anomalies in, e.g., a massive volume of log files 140. To make anomaly detection logic 190 more robust to the high degree of variability in unstructured data such as text, the lists of words 330(1), 330(2), 330(N) are, in accordance with an embodiment, enriched using semantically and syntactically similar words. The enrichment may be made using standard Natural Language Processing, for example.

Figure 4:
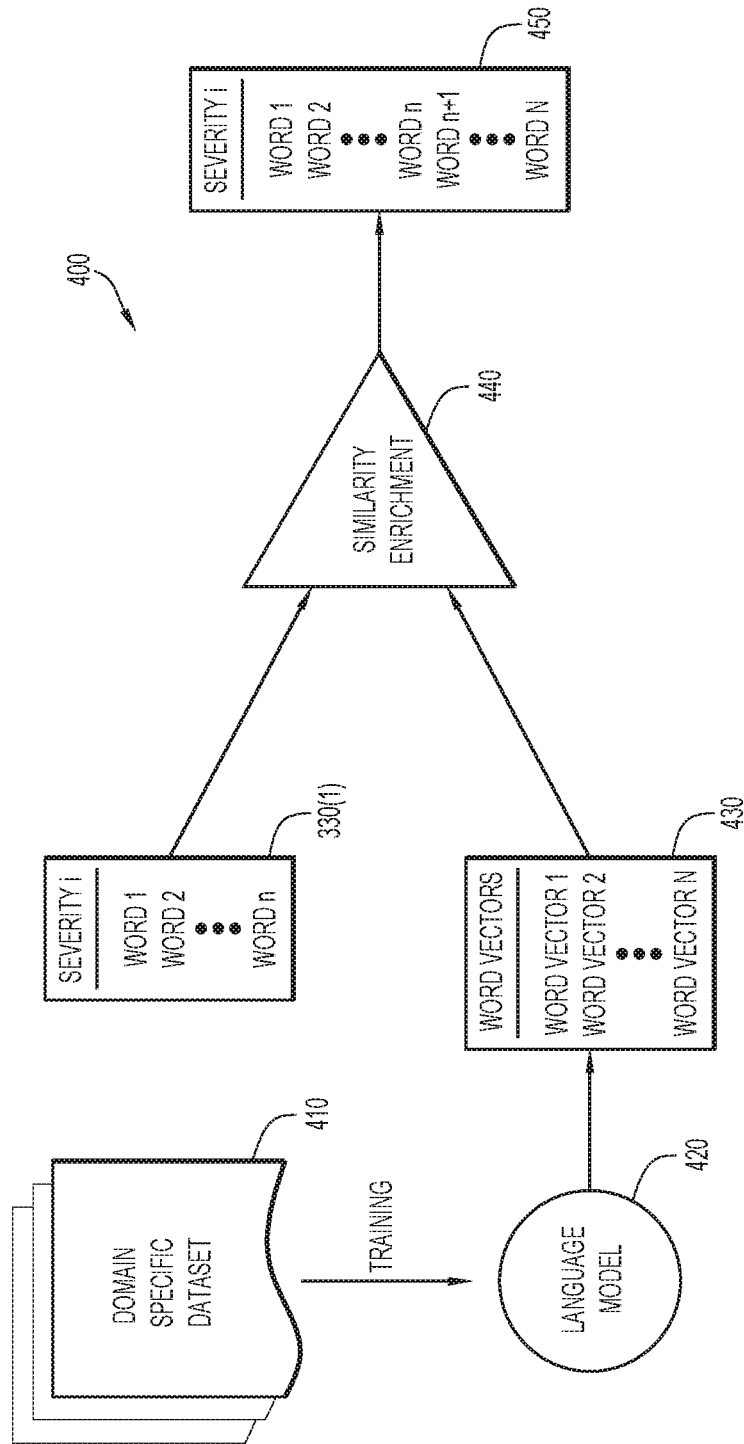
FIG. 4 shows a workflow for a list enrichment process in accordance with an example embodiment.

FIG. 4 shows a workflow 400 for a list enrichment process in accordance with an example embodiment. At 410, a domain specific dataset, like annotated unstructured data set 200, is provided as training data to a language model 420. As noted, the language model may use Natural Language Processing techniques. The output of language model 420 is a set of word vectors shown at 430, which are then combined at 440 with, e.g., list of words 330(1) to obtain an enriched list 450 associated with a given severity level. Each list of words 330(1), 330(2), 330(N), may be processed in the same manner, resulting in multiple enriched lists 450, associated with respective severity levels.

As an example, at the first step, lists of words 330(1), 330(2), 330(N) were extracted for each severity/category/class, wherein that lists of words 330(1), 330(2), 330(N) were created using ML on a very small subset of anomalies, because experts can only tag so much, and may be expensive to use. The consequence of this is that the lists of words 330(1), 330(2), 330(N) are not very extensive, and synonyms or contextually similar words may be omitted. This is the reason for performing the enrichment step.

It is noted that the embodiments described herein may be optimized to work in a domain-specific field, where words such as "drops", "frames", and "packets" mean something different compared to common English usage. Thus, rather than using a generic English language thesaurus to enrich the lists of words 330(1), 330(2), 330(N), "domain specific text", which can include, e.g., documentation, Wikipedia articles, emails, machine output, etc., may be fed into language model 420. Language model 420 generates a "vectorization" of the words present in the domain specific text, i.e., each word is represented as a vector. FIG. 5 shows the use of a cosine similarity measure approach in accordance with an example embodiment. That is, FIG. 5 shows that words similar to "drops" (an attended word in the annotated unstructured data set 200 of FIG. 2) may include "drop", "loss" and "fault". These latter words are used to generate enriched list 450.

The vocabulary for enriched list 450 may be expanded either explicitly (e.g., cosine similarity measure in word vector space) or implicitly (reusing ML language model at, e.g., 320 in FIG. 3, to highlight semantically close words). In an alternative embodiment, a "Word2Vec" language model may be employed. Such models are configured to retrieve words similar to the list of "trigger words" (i.e., the attended words) up to a parametric similarity (e.g., >0.9 cosine similarity).

Figure 6:
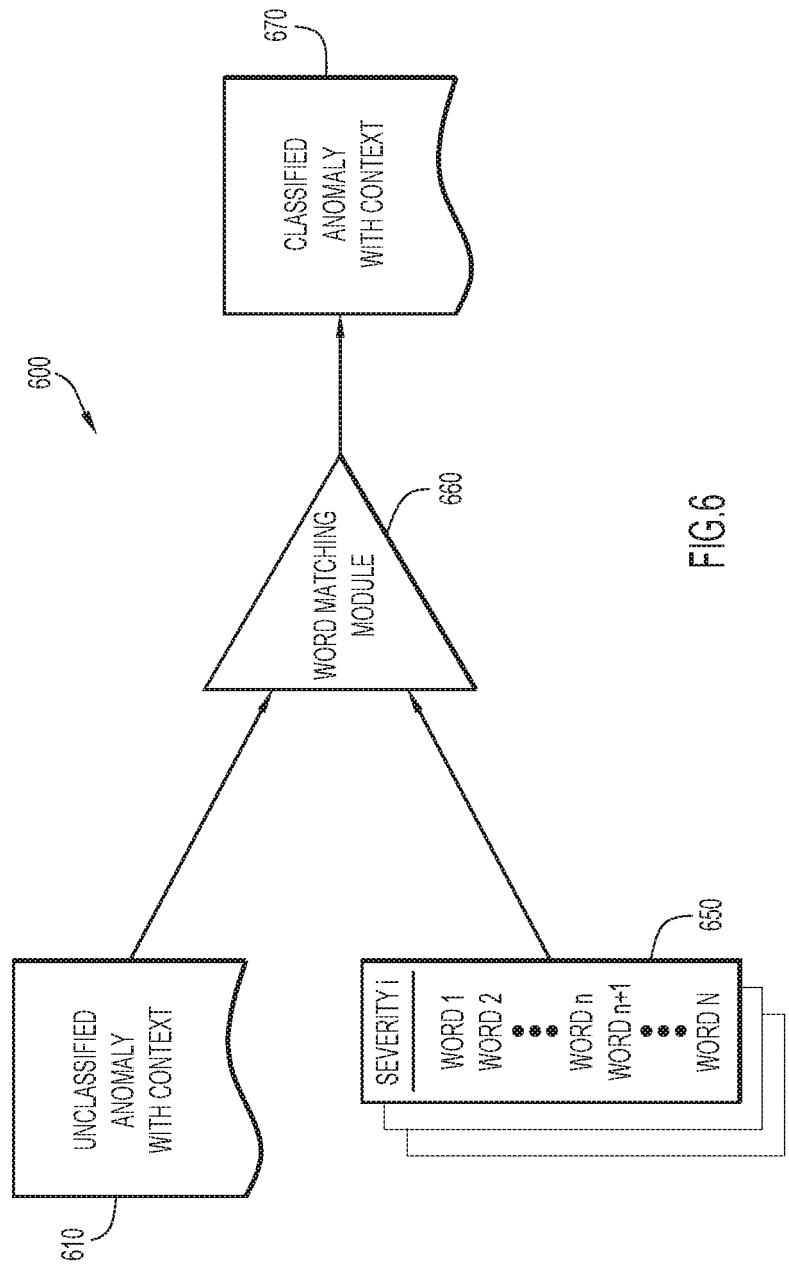
FIG. 6 shows a production system that classifies anomalies in accordance with an example embodiment.

The now enriched lists of words can be used in a production system to efficiently classify previously unsupervised and unclassified anomalies. FIG. 6 shows a production system 600 that classifies anomalies in accordance with an example embodiment. As shown, unclassified anomaly with context 610 (i.e., a structured or unstructured data set) is supplied to a word matching module 660. Word matching is then performed against one or more enriched lists 650. When a word in the enriched lists(s) 650 is detected close to an anomaly, the anomaly can be classified regarding, e.g., its severity, accordingly. That is, 670 depicts a classified anomaly with context resulting from the word matching performed word matching module 660.

Figure 7:
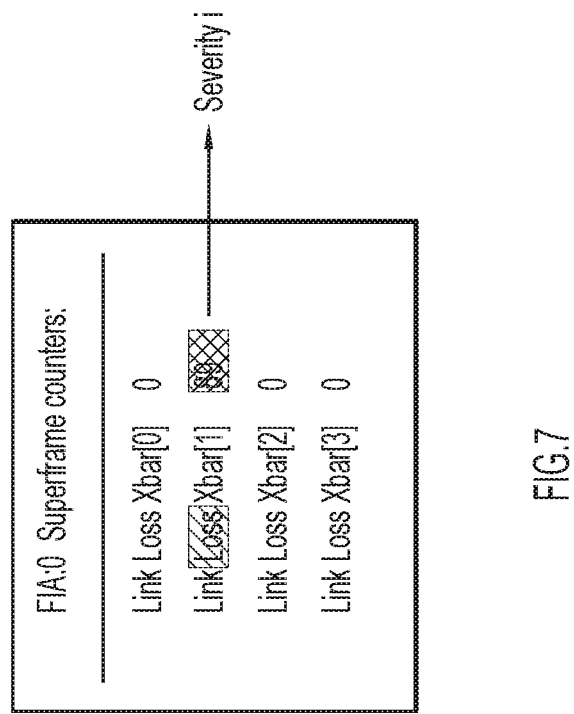
FIG. 7 shows how anomaly detection logic finds an attended word near an anomaly and can thus classify that anomaly in accordance with example embodiment.

FIG. 7 shows how anomaly detection logic 190 finds an attended word near an anomaly and can thus classify (e.g., assign a severity level to) that anomaly in accordance with example embodiment. That is, FIG. 7 shows how anomaly detection logic 190 finds an attended word (e.g., "Loss", which was a word added via the list enrichment process) near an anomalous number ("89") and can thus assign a severity level (e.g., "Severity i") corresponding to enriched list 650 from FIG. 6. As such, anomaly detection logic 190 can assign a severity level to an anomaly, even if that particular output has never been part of a training data set.

This skilled in the art will appreciate that the techniques described herein may also further incorporate a feedback mechanism that permits a user to directly add words to a given enriched list 650.

Figure 8:
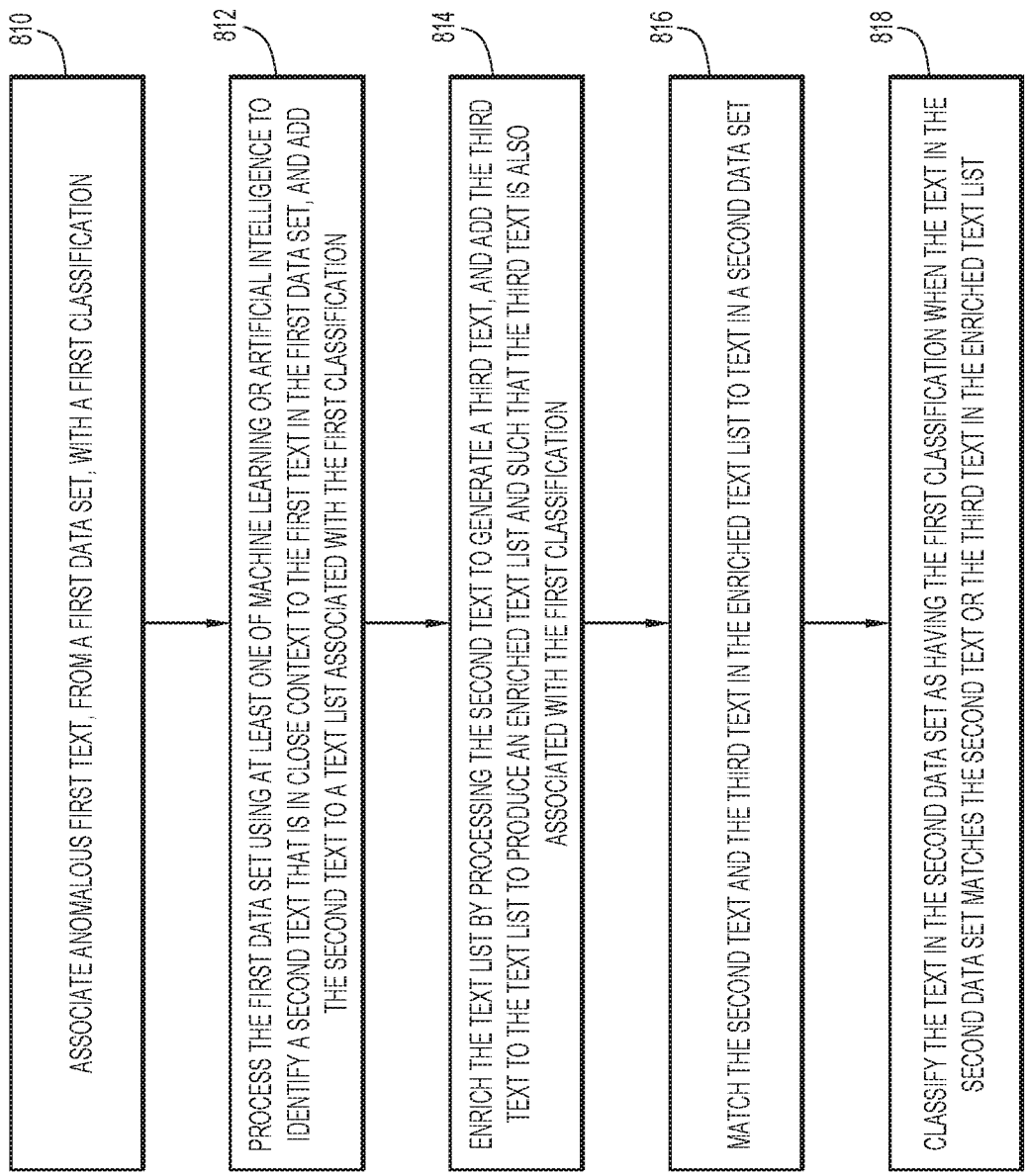
FIG. 8 is a flowchart depicting a series of operations for classifying anomalies in structured and unstructured data in accordance with an example embodiment.

FIG. 8 is a flowchart depicting a series of operations for classifying anomalies in structured and unstructured data in accordance with an example embodiment. At 810, an operation associates anomalous first text, from a first data set, with a first classification. At 812, an operation processes the first data set using at least one of machine learning or artificial intelligence to identify a second text that is in close context to the first text in the first data set, and add the second text to a text list associated with the first classification. At 814, an operation enriches the text list by processing the second text to generate a third text, and add the third text to the text list to produce an enriched text list and such that the third text is also associated with the first classification. At 816 an operation matches the second text and the third text in the enriched text list to text in a second data set. And, at 818, an operation classifies the text in the second data set as having the first classification when the text in the second data set matches the second text or the third text in the enriched text list.

The described innovative anomaly classification/detection system and anomaly detection logic 190 provide several benefits. The approach enables classifying high severity anomalies coming from any "black box unsupervised" anomaly detection system. The methodology requires only limited amount of an (expensive and domain specific) expert's time. Most of an expert's time is used to build the "attention model". The methodology can be used for any domain, i.e., the system is domain agnostic. That said, an issue that may be encountered is that a given NLP system may not be domain specific. In such a case, the system can learn what is considered high severity for each domain separately.

The system is also fast to run in production. The running system corresponds to a word matching in the context of anomalies, and thus there is no need to run heavy machine learning models against, e.g., log files to be analyzed. The system also allows for constant self-improvement based on user/expert feedback.

Finally, using a ML system to learn embedding of a context allows for complex and multi-facet contexts that may include device type, device role and other metadata. This is something where traditional rule-based system infamously struggle.

Figure 9:
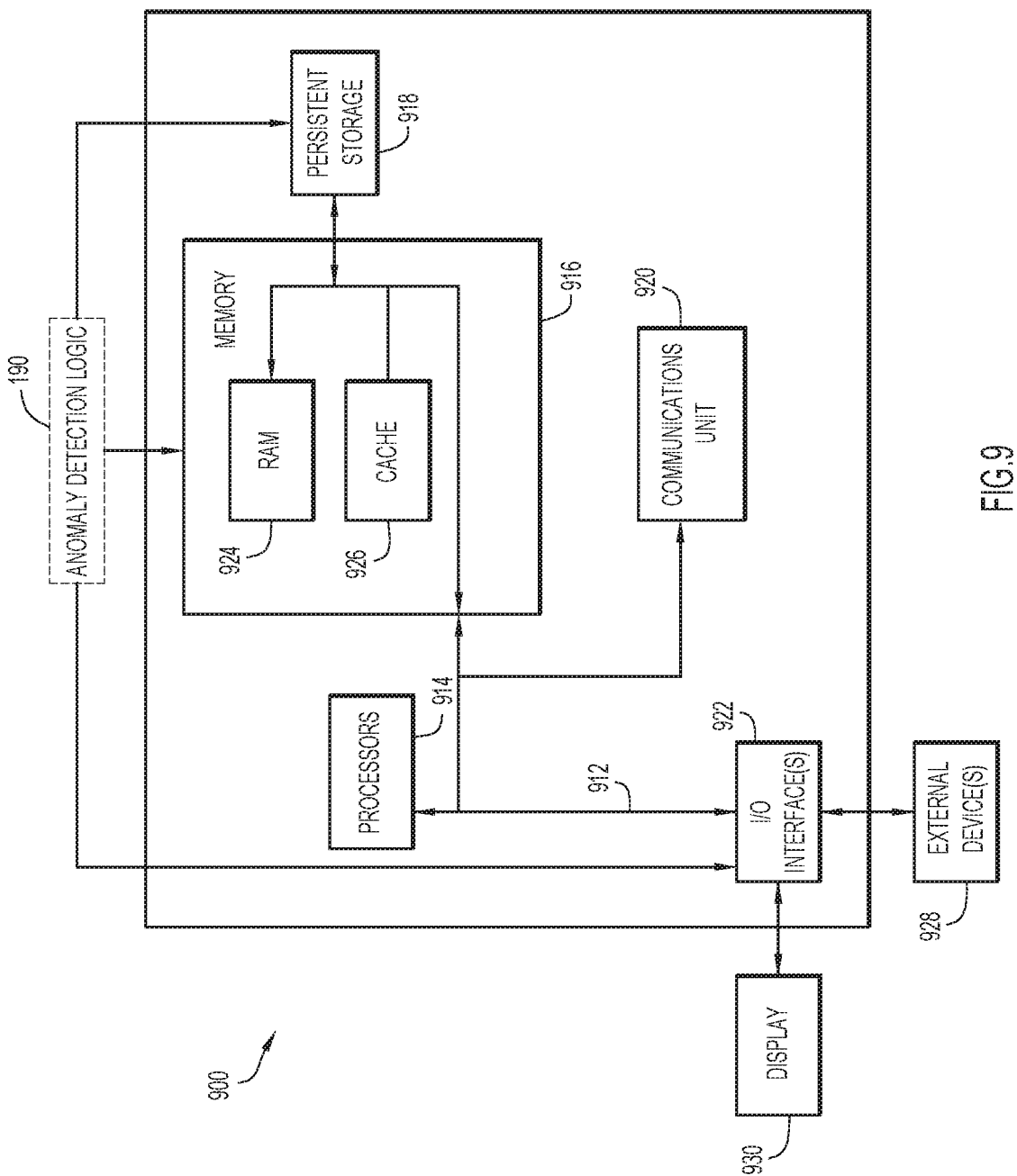
FIG. 9 depicts a device (e.g., an analysis server) that executes anomaly detection logic in accordance with an example embodiment.

FIG. 9 depicts a device (e.g., analysis server 150) that executes counter update logic 190 in accordance with an example embodiment. It should be appreciated that FIG. 9 provides only an illustration of one embodiment and does not imply any limitations with regard to the environments in which different embodiments may be implemented. Many modifications to the depicted environment may be made. Indeed, in many implementations of a device configured to host anomaly detection logic 190, much of the hardware described below may not be needed.

As depicted, the device 900 includes a bus 812, which provides communications between computer processor(s) 914, memory 916, persistent storage 918, communications unit 920, and input/output (I/O) interface(s) 922. Bus 912 can be implemented with any architecture designed for passing data and/or control information between processors (such as microprocessors, communications and network processors, etc.), system memory, peripheral devices, and any other hardware components within a system. For example, bus 912 can be implemented with one or more buses.

Memory 916 and persistent storage 918 are computer readable storage media. In the depicted embodiment, memory 916 includes random access memory (RAM) 924 and cache memory 926. In general, memory 916 can include any suitable volatile or non-volatile computer readable storage media. Instructions for the anomaly detection logic 190 may be stored in memory 916 or persistent storage 918 for execution by processor(s) 914.

One or more programs may be stored in persistent storage 918 for execution by one or more of the respective computer processors 914 via one or more memories of memory 916. The persistent storage 918 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 918 may also be removable. For example, a removable hard drive may be used for persistent storage 918. Other examples include optical and magnetic disks, thumb drives, and smart cards that are inserted into a drive for transfer onto another computer readable storage medium that is also part of persistent storage 918.

Communications unit 920, in these examples, provides for communications with other data processing systems or devices. In these examples, communications unit 920 includes one or more network interface cards. Communications unit 920 may provide communications through the use of either or both physical and wireless communications links.

I/O interface(s) 922 allows for input and output of data with other devices that may be connected to device 900. For example, I/O interface 922 may provide a connection to external devices 928 such as a keyboard, keypad, a touch screen, and/or some other suitable input device. External devices 928 can also include portable computer readable storage media such as database systems, thumb drives, portable optical or magnetic disks, and memory cards.

Software and data used to practice embodiments can be stored on such portable computer readable storage media and can be loaded onto persistent storage 918 via I/O interface(s) 922. I/O interface(s) 922 may also connect to a display 930. Display 930 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), digital logic gates in one or more fixed or programmable integrated circuits, or programmable logic arrays (PLA) may execute the instructions by utilizing configuring the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes associating anomalous first text, from a first data set, with a first classification; processing the first data set using at least one of machine learning or artificial intelligence to identify a second text that is in close context to the first text in the first data set, and adding the second text to a text list associated with the first classification; enriching the text list by processing the second text to generate a third text, and adding the third text to the text list to produce an enriched text list and such that the third text is also associated with the first classification; matching the second text and the third text in the enriched text list to text in a second data set; and classifying the text in the second data set as having the first classification when the text in the second data set matches the second text or the third text in the enriched text list.

In an embodiment, at least one of the first data set and the second data set is unstructured. In another embodiment, one of the first data set and the second data set is structured.

In one implementation, the first classification may include a severity level.

In an embodiment, processing the second text may include processing the second text using natural language processing.

In an embodiment, in close context means, e.g., within 5 words of the first text.

In an embodiment, processing the second text to generate the third text may include applying a cosine similarity measure to select the third text.

In another embodiment, the method includes generating multiple enriched lists, each associated with a respective classification.

The first data set and the second data set may be log files from a same domain. And, the method may include receiving the log files from a network device, such as a switch or router, operating in a network.

In another form, an apparatus device may also be provided in accordance with an embodiment. The device may include a network interface unit configured to enable communications via a network; a memory configured to store logic instructions; and a processor, when executing the logic instructions, configured to: associate anomalous first text, from a first data set, with a first classification; process the first data set using at least one of machine learning or artificial intelligence to identify a second text that is in close context to the first text in the first data set, and add the second text to a text list associated with the first classification; enrich the text list by processing the second text to generate a third text, and add the third text to the text list to produce an enriched text list and such that the third text is also associated with the first classification; match the second text and the third text in the enriched text list to text in a second data set; and classify the text in the second data set as having the first classification when the text in the second data set matches the second text or the third text in the enriched text list.

In an embodiment, at least one of the first data set and the second data set is unstructured. In another embodiment, at least one of the first data set and the second data set is structured.

In an embodiment, the first classification may include a severity level.

The processor may be further configured to process the second text to generate the third text by processing the second text using natural language processing.

The processor may be further configured to process the second text to generate the third text by applying a cosine similarity measure to select the third text.

In an embodiment, the first data set and the second data set may be log files from a network device, such as a switch or router, operating in a network.

In still another form, a non-transitory computer readable storage media is provided that is encoded with instructions that, when executed by a processor, cause the processor to associate anomalous first text, from a first data set, with a first classification; process the first data set using at least one of machine learning or artificial intelligence to identify a second text that is in close context to the first text in the first data set, and add the second text to a text list associated with the first classification; enrich the text list by processing the second text to generate a third text, and add the third text to the text list to produce an enriched text list and such that the third text is also associated with the first classification; match the second text and the third text in the enriched text list to text in a second data set; and classify the text in the second data set as having the first classification when the text in the second data set matches the second text or the third text in the enriched text list.

In an embodiment, at least one of the first data set and the second data set may be unstructured.

In an embodiment, the instructions cause the processor to process the second text to generate the third text by processing the second text using natural language processing.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   associating anomalous first text, from a first data set, with a first classification;
   processing the first data set using at least one of machine learning or artificial intelligence to identify a second text that is within five words of the anomalous first text in the first data set, and adding the second text to a text list associated with the first classification;
   enriching the text list by processing the second text to generate a third text, and adding the third text to the text list to produce an enriched text list and such that the third text is also associated with the first classification, wherein the third text is a synonym of the second text, and the synonym is obtained via a language model which is augmented with domain specific text;
   matching at least one of the second text or the third text in the enriched text list to text in a second data set that is different from the first data set; and
   classifying the text in the second data set as having the first classification when the text in the second data set matches the second text or the third text in the enriched text list.

2. The method of claim 1, wherein at least one of the first data set and the second data set is unstructured.

3. The method of claim 1, wherein at least one of the first data set and the second data set is structured.

4. The method of claim 1, wherein the first classification comprises a severity level.

5. The method of claim 1, wherein processing the second text comprises processing the second text using natural language processing.

6. The method of claim 1, wherein processing the second text to generate the third text comprises applying a cosine similarity measure to select the third text.

7. The method of claim 1, further comprising generating multiple enriched lists, each associated with a respective classification.

8. The method of claim 1, wherein the first data set and the second data set are log files from a same domain.

9. The method of claim 8, further comprising receiving the log files from a network device operating in a network.

10. An apparatus comprising:
a network interface unit configured to enable network communications;
a memory configured to store logic instructions; and
a processor, when executing the logic instructions, configured to:
associate anomalous first text, from a first data set, with a first classification;
process the first data set using at least one of machine learning or artificial intelligence to identify a second text that is within five words of the anomalous first text in the first data set, and add the second text to a text list associated with the first classification;
enrich the text list by processing the second text to generate a third text, and add the third text to the text list to produce an enriched text list and such that the third text is also associated with the first classification, wherein the third text is a synonym of the second text, and the synonym is obtained via a language model which is augmented with domain specific text;
match at least one of the second text or the third text in the enriched text list to text in a second data set that is different from the first data set; and
classify the text in the second data set as having the first classification when the text in the second data set matches the second text or the third text in the enriched text list.

11. The apparatus of claim 10, wherein at least one of the first data set and the second data set is unstructured.

12. The apparatus of claim 10, wherein at least one of the first data set and the second data set is structured.

13. The apparatus of claim 10, wherein the first classification comprises a severity level.

14. The apparatus of claim 10, wherein the processor is further configured to process the second text to generate the third text by processing the second text using natural language processing.

15. The apparatus of claim 10, wherein the processor is further configured to process the second text to generate the third text by applying a cosine similarity measure to select the third text.

16. The apparatus of claim 10, wherein the first data set and the second data set are log files from a network device operating in a network.

17. The apparatus of claim 10, wherein the processor is further configured to generate multiple enriched lists, each associated with a respective classification.

18. A non-transitory computer readable storage media encoded with instructions that, when executed by a processor, cause the processor to:
associate anomalous first text, from a first data set, with a first classification;
process the first data set using at least one of machine learning or artificial intelligence to identify a second text that is within five words of the anomalous first text in the first data set, and add the second text to a text list associated with the first classification;
enrich the text list by processing the second text to generate a third text, and add the third text to the text list to produce an enriched text list and such that the third text is also associated with the first classification, wherein the third text is a synonym of the second text, and the synonym is obtained via a language model which is augmented with domain specific text;
match at least one of the second text or the third text in the enriched text list to text in a second data set that is different from the first data set; and
classify the text in the second data set as having the first classification when the text in the second data set matches the second text or the third text in the enriched text list.

19. The non-transitory computer readable storage media of claim 18, wherein at least one of the first data set and the second data set is unstructured.

20. The non-transitory computer readable storage media of claim 18, wherein the instructions cause the processor to process the second text to generate the third text by processing the second text using natural language processing.

* * * * *